Oct. 21, 1958

A. VAN DUYN 2,856,786

BELT TENSIONER FOR SLICING MACHINES

Filed Sept. 10, 1956

INVENTOR
ADRIANUS VAN DUYN

BY *Marshall, Johnston, Cook & Root*

ATTORNEYS

_United States Patent Office_

2,856,786
Patented Oct. 21, 1958

2,856,786
BELT TENSIONER FOR SLICING MACHINES

Adrianus van Duyn, Hillegersberg, Rotterdam, Netherlands, assignor to U. S. Slicing Machine Company, Inc., La Porte, Ind., a corporation of Indiana Application September 10, 1956, Serial No. 608,733

Claims priority, application Great Britain September 21, 1955

5 Claims. (Cl. 74—242.8)

This invention relates to a belt tensioner for use in a slicing machine wherein the slicing knife is driven by a motor through a belt and pulley arrangement. More particularly, the invention relates to an improved belt tensioner that is adjustable but which automatically limits the tension of the belt to a predetermined value. Other uses and purposes will be apparent to one skilled in the art from the following description.

By way of specific example, the tensioner of the present invention as applied to a slicing machine, includes a device operable from the exterior of the machine to apply belt tension to a belt and pulley drive arrangement, wherein the belt tension increases to a value at which continued operation of the device ceases to be effective. The device includes a spring and screw arrangement associated with a tensioning pulley and being arranged so that when the screw is rotated under reduced tension conditions it advances through a nut initially held against turning and increases the tension until the tension is increased sufficiently to deflect the spring, at which time continued rotation of a screw causes the nut to back off to a position where it is free to corotate with the screw. At this point, further tensioning of the belt is eliminated.

Accordingly, it is an object of this invention to provide an improved belt tensioner that is adjustable but which automatically limits the tension of the belt to a predetermined value.

Another object of this invention resides in the provision of a belt tensioner for use on slicing machines, wherein the tensioner includes a device operable from the exterior of the slicing machine to apply belt tension to a belt and pulley drive arrangement which increases to a value at which continued operation of the device ceases to be effective.

A still further object of this invention is in the provision of a belt tensioner for slicing machines having the slicing knife driven by a motor through a belt and pulley drive arrangement, wherein the tensioner includes a spring and screw arrangement associated with a tensioning pulley, the screw of which, when rotated under reduced tension conditions, advances through a nut then held against rotation to increase the tension until the tension is increased sufficiently to deflect the spring, whereas continued turning of the screw causes the nut to take a position such that it will corotate with the screw and preclude further tensioning of the belt.

Other objects, features, and advantages of the invention will be apparent from the following detailed disclosure, taken in conjunction with the accompanying sheets of drawings, wherein like reference numerals refer to like parts, in which.

Figure 1:
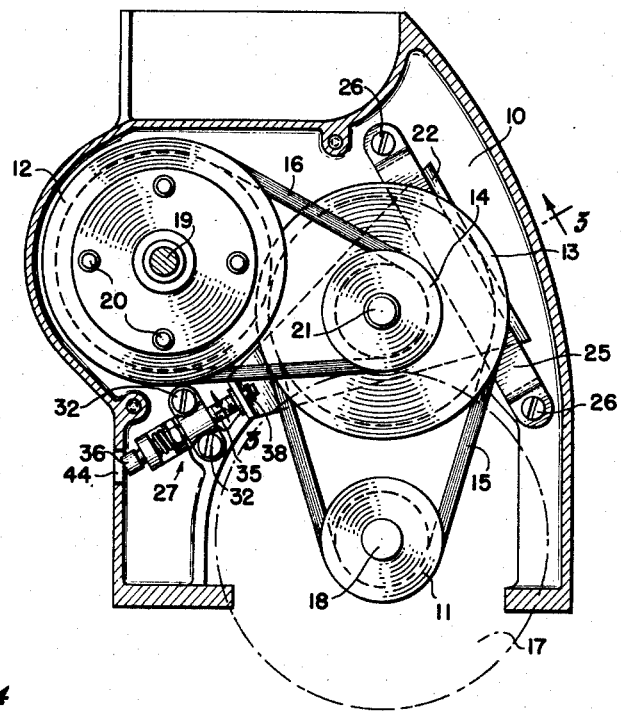
Fig. 1 is a view taken through a casing of a slicing machine showing in elevation a belt and pulley drive arrangement in association with the belt tensioner of the present invention.
Figure 2:
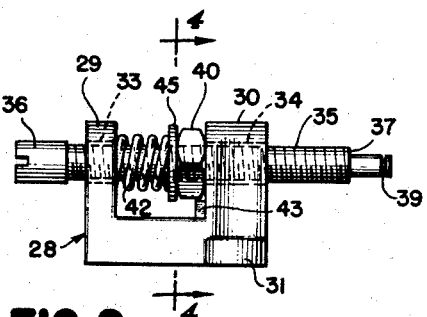
Fig. 2 is essentially a bottom plan view of the spring and screw arrangement utilized in the present invention.
Figure 4:
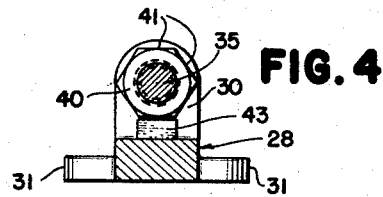
Fig. 4 is a transverse sectional view, taken substantially along line 4—4 of Fig. 2 and looking in the direction of the arrows.
Figure 3:
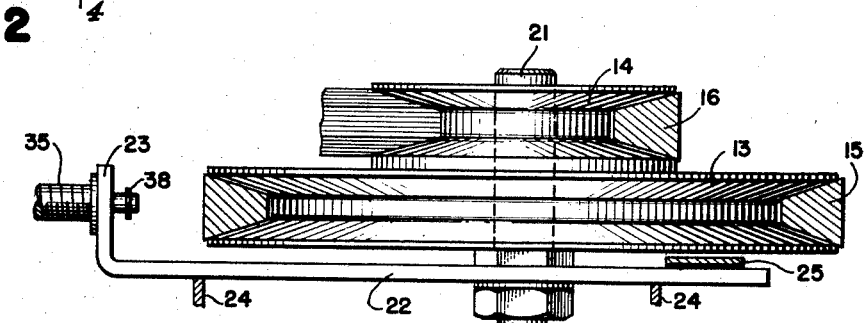
Fig. 3 is a greatly enlarged view, taken along line 3—3 of Fig. 1 and looking in the direction of the arrows, illustrating some parts in elevation and other parts in section.

Referring to Fig. 1, 10 indicates the knife bracket of the conventional slicing machine, the bracket being more or less constructed as a casing. It will be noted that the slicing knife is omitted so that the interior of the casing is exposed to show the underlying parts and the invention. As is conventional in slicing machines the knife bracket is mounted on one side of the machine base, upon which is supported a reciprocable carriage that carries the meat or other substances to be cut into slices in succession by a circular slicing knife, the latter being supported by the bracket 10. These conventional parts of the slicing machine are not illustrated inasmuch as they do not comprise a part of this invention, and since they are well known in the prior art.

The tensioner of the present invention is associated with a belt and pulley drive arrangement which generally includes a driving pulley 11, a driven pulley 12, and first and second intermediate tensioning pulleys 13 and 14. The driving pulley 11 and the first intermediate pulley 13 are drivingly connected by a first V-belt 15, while the second intermediate pulley 14 and the driven pulley 12 are connected by a second V-belt 16. It may be noted that the size of the pulleys is such as to provide a speed reduction stage between the driving pulley 11 and the driven pulley 12.

Power is transmitted to the driving motor 17 having a motor shaft 18 on which the driving pulley 11 is mounted for corotation therewith. While not shown, the electric motor 17 may be mounted on the base or the knife bracket 10 or any other portion of the machine frame, wherein the motor shaft extends into the casing formed by the bracket 10.

The driven pulley 12 is mounted in a shaft 19 journalled in a bearing carried by the bracket 10. A plurality of circumferentially arranged holes 20 are provided on the driven pulley 12 for receiving screws which secure the knife hub to the pulley, the latter not being shown. Thus the slicing knife is directly connected to the driven pulley 12 and driven thereby.

The intermediate tensioning pulleys 13 and 14 are mounted for corotation with one another on a common shaft 21 that is rotatably supported on a floating carrier plate 22 which is positioned between the driving and driven pulleys. This plate is substantially triangular in shape and provided at one apex with an outstanding flange or lug 23. Further, this plate 22 is floating in the sense that it is freely movable in a vertical plane under the limitation of spaced bearing members 24 on the knife bracket 10 at one side of the plate and a strap member 25 at the other side of the plate being secured at opposite ends to the knife bracket by fasteners 26.

Biasing of the belt 15 and 16 is accomplished by a spring and screw arrangement, generally designated by the numeral 27 which includes a stationary member 28 having spaced parallel jaws or bars 29 and 30. Laterally extending lugs 31, integral with the stationary member 28 provides means which receive fasteners 32 for rigidly securing the stationary member to the knife bracket 10. Aligned bores 33 and 34 are provided in the jaws 29 and 30, respectively, for slideably receiving an externally threaded thrust transmitting member 35. This thrust transmitting member is provided with a slotted head 36 at its outer end and a diametrically reduced section at its other end which defines an annular shoulder or ledge 37. The outstanding flanges 23 on the carrier plate 22 is suitably apertured to receive the diametrically reduced end of the thrust transmitting member 35, wherein the shoulder 37 bears against the outer side of the flange 23. After the diametrically thrust transmitting member 35 has been received in the apertured flange 23, it is held in place by a split locking ring 38 received in an annular groove 39. It will be noted in Fig. 1 that the thrust transmitting member 35 is so arranged that its axis extends through or near the axis of the common shaft 21 of the intermediate pulleys 13 and 14.

The spring and screw arrangement further includes a nut 40 having a plurality of connected flat faces 41. This nut is threadedly received on the threaded portion of the thrust transmitting member and between the jaws 29 and 30 of the supporting member 28. One side of the nut 40 normally abuts against the inside face of the jaw 30, while the other side engages an anti-friction washer 45. A spring 42 which is received freely over the thrust transmitting member 35 extends between the jaw 29 and the washer 45 thereby normally urging the nut 40 to abut against the jaw 30. In order to lock the nut 40 against turning when it is in this position, a narrow ledge or stop 43 formed adjacent the lower end of the jaw 30 engages one of the flat faces 41 of the nut 40 thereby preventing corotation of the nut and threaded thrust member.

The position of the carrier plate 22 is determined by the pull of belts 15 and 16 on the common shaft 21 against the reaction of the thrust transmitting member 35. In other words, the belt under tension acts through the common shaft 21 and carrier plate 22 to apply to the thrust transmitting member 35 a force which is the resultant of the pull of the two belts. It will be appreciated that the shafts 18, 19 and 21 and the thrust transmitting member 35 are relatively positioned so that the tension in the belts will be substantially equal.

Assuming that the belts 15 and 16 are inadequately tensioned, and that the operator wishes to increase the tension, it is only necessary for the operator to insert a screw-driver through the opening 44 provided in the knife bracket casing to engage the slotted head 36 of the thrust transmitting member 35. By rotating the thrust transmitting member 35 clockwise the threaded member advances through the nut 40, thereby urging the carrier plate 22 in a direction which increases the tension of the belt 15 and 16 in substantially equal amounts. When the tension of the belt begins to exceed the force of the spring 42, the spring will begin to compress thereby causing the nuts 40 to back off from the jaw 30. When the nut 40 passes from the control of the ledge or stop member 43, it will turn freely with the thrust transmitting member 35 thereby preventing further tensioning of the belts 15 and 16. Accordingly, even if the operator continues to run the screw clockwise, the thrust transmitting member 35 and the nut 40 merely rotate together without increasing the tension of the belt. Therefore, a predetermined tension of the belt may be accomplished depending primarily on the type of spring employed and the width of the ledge or stop member 43. It will be further appreciated that without viewing the belt or the spring and screw arrangement in the casing, a predetermined tension may be applied to the belt.

From the foregoing, it is seen that the present invention provides a belt tensioner which is adjustable, and which safeguards against exceeding a selected tension value in the belts.

While the present invention has been described as associated with the tensioning of a pair of belts, it will be understood that the invention may be equally applied to a single belt arrangement.

It will be understood that modifications and variations may be effected without departing from the scope of the novel concepts of the present invention but it is understood that this application is to be limited only by the scope of the appended claims.

The invention is hereby claimed as follows:

1. In a slicing machine, an upstanding knife bracket, a driving pulley and a driven pulley mounted in spaced relationship on said bracket, said driven pulley adapted to be connected to a slicing knife, a pair of intermediate pulleys being coaxially connected together, said intermediate pulleys being mounted on a floating carrier plate carried by said bracket, a first belt drivingly connecting said driving pulley and one of said intermediate pulleys, a second belt drivingly connecting said driven pulley and said other intermediate pulley, and means for biasing said carrier plate in such a direction as to tension said belts, said means including a fixed member mounted on said bracket, a threaded member guidably received by said fixed member and engaging said carrier plate, a nut threadedly received on said threaded member and abutting against a side of said fixed member remote from said carrier plate, means for preventing said nut from turning relative to the threaded member while the nut is within a predetermined distance from said fixed member side, and resilient means biasing said threaded member so it will tension said belts.

2. In a slicing machine, a knife bracket, driving and driven pulleys mounted in spaced relationship on said bracket, said driving pulley adapted to be connected to a motor and said driven pulley adapted to be connected to a slicing knife, a floating carrier plate mounted on said bracket, coaxial first and second intermediate pulleys mounted for corotation on said carrier plate, a first belt trained over said driving pulley and said first intermediate pulley, a second belt trained over said driven pulley and said second intermediate pulley, and adjustable means for biasing said carrier plate and intermediate pulleys and substantially equally tensioning said belts, including a member fixed to said bracket and having spaced jaws extending therefrom, a threaded force transmitting member guidably received by said jaws and having one end in engagement with said carrier plate, a nut threadedly received on said threaded member and between said jaws, a spring on said threaded member bottomed on one end against one side of said nut and on the other end against one of said jaws to urge said nut against said other jaw and in a direction to tension said belts, and means adjacent said other jaw for preventing corotation of said nut and threaded member while the belt tensions are below a predetermined amount.

3. In a slicing machine, a knife bracket, driving and driven pulleys mounted in spaced relationship on said bracket, said driving pulley adapted to be connected to a motor and said driven pulley adapted to be connected to a slicing knife, a floating carrier plate mounted on said bracket, coaxial first and second intermediate pulleys mounted for corotation on said carrier plate, a first belt trained over said driving pulley and said first intermediate pulley, a second belt trained over said driven pulley and said second intermediate pulley, and adjustable means for biasing said carrier plate and intermediate pulleys and substantially equally tensioning said belts including a member fixed to said bracket and having spaced jaws extending therefrom, said jaws having bores in alignment with movement of said carrier plate, a threaded force transmitting member slidably received in said bores and having one end in engagement with said carrier plate, said nut having a plurality of circumferentially arranged flat faces, and stop means adjacent said other jaw for engaging one of the flat faces on said nut for preventing corotation of said nut and threaded member when the belt tensions are below a predetermined amount, whereby rotation of said threaded member adjusts the belt tensions and continued rotation of said threaded member after the belt tensions reach a predetermined amount causes the nut to back away from said other jaw and disengage from said stop means to permit corotation of said nut and threaded member and prevent excessive belt tensioning.

4. A belt tensioner for use on slicing machines having driving and driven pulleys connected by a belt which comprises a floating carrier plate for mounting one of said pulleys, and adjustable means for biasing said carrier plate including a fixed member having spaced jaws, a threaded force transmitting member guidably received by said jaws and having one end in engagement with said carrier plate, a nut threadedly received on said threaded member and between said jaws, a spring on said threaded member bottomed on one end adjacent one side of said nut and on the other end against one of said jaws to urge said nut against said other jaw and in a direction to tension said belt, and means on said other jaw coacting with said nut for preventing relative rotation between the nut and fixed member when the belt tension is below a predetermined value.

5. A tensioner for use on devices having driving and driven pulleys operatively connected by a belt which comprises a base for mounting one of said pulleys, a floating carrier plate on said base mounting the other pulley for movement along a prescribed path, and adjustable means for biasing said carrier plate in a direction to tension said belt, said means including a member fixed to said base and having spaced jaws extending therefrom, said jaws having bores in alignment with movement of said carrier plate, a threaded force transmitting member slidably received in said bores and having one end in engagement with said carrier plate, a nut threadedly received on said threaded member and between said jaws, a spring on said threaded member bottomed on one end against one side of said nut and on the other end against one of said jaws to urge said nut against said other jaw and in a direction to tension said belts, said nut having a plurality of circumferentially arranged flat faces, and stop means adjacent said other jaw for engaging one of the flat faces on said nut for preventing corotation of said nut and threaded member when the belt tension is below a predetermined amount, whereby rotation of said threaded member adjusts the belt tension and continued rotation of said threaded member after the belt tensions reach a predetermined amount causes the nut to back away from said other jaw and disengage from said stop means to permit corotation of said nut and threaded member and prevent excessive belt tensioning.

References Cited in the file of this patent

UNITED STATES PATENTS

| 55,344 | Nell | June 5, 1866 |
| 2,259,567 | Johson et al. | Oct. 21, 1941 |
| 2,564,132 | Scott | Aug. 14, 1951 |

FOREIGN PATENTS

| 637,049 | Great Britain | May 10, 1950 |